US009270096B2

(12) United States Patent
Doushita et al.

(10) Patent No.: US 9,270,096 B2
(45) Date of Patent: Feb. 23, 2016

(54) WIRE HARNESS FIXING STRUCTURE

(71) Applicant: Yazaki Corporation, Tokyo (JP)

(72) Inventors: Kenichi Doushita, Makinohara (JP);
Mitsunori Tsunoda, Makinohara (JP);
Kouhei Niiho, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/531,211

(22) Filed: Nov. 3, 2014

(65) Prior Publication Data

US 2015/0048221 A1  Feb. 19, 2015

Related U.S. Application Data

(63) Continuation of application No. PCT/JP2013/002931, filed on May 7, 2013.

(30) Foreign Application Priority Data

May 8, 2012 (JP) .................................. 2012-106542
Sep. 5, 2012 (JP) .................................. 2012-195116

(51) Int. Cl.
*H02G 3/04* (2006.01)
*B60R 16/02* (2006.01)

(52) U.S. Cl.
CPC .............. *H02G 3/04* (2013.01); *B60R 16/0215* (2013.01)

(58) Field of Classification Search
CPC ............. H02G 3/22; H02G 3/24; H02G 3/30; H02G 3/305; H02G 3/32; H02G 3/36; H02G 3/386; H02G 3/388; B60R 16/02; B60R 16/0207; B60R 16/0215; F16B 19/00; F16B 19/002; F16B 19/004; F16B 3/233; F16B 3/04; F16B 3/00; F16B 3/006

USPC .............. 174/480, 483, 650, 135, 72 A, 70 R, 174/40 CC, 68.1; 248/49, 74.1, 74.2, 74.3, 248/73, 71

See application file for complete search history.

(56) References Cited

U.S. PATENT DOCUMENTS 4,358,081 A * 11/1982 Notoya .................... F16L 3/233
                                                      248/74.3
4,918,261 A *  4/1990 Takahashi ................ F16L 3/08
                                                      174/72 A (Continued)

FOREIGN PATENT DOCUMENTS

JP     2007-259604 A    10/2007

OTHER PUBLICATIONS

International Search Report and Written Opinion mailed Jan. 30, 2014, issued for PCT/JP2013/002931.

*Primary Examiner* — Angel R Estrada
(74) *Attorney, Agent, or Firm* — Locke Lord LLP

(57) ABSTRACT

Disclosed is a wire harness fixing structure allowing deformation volume of a middle of a plate in a wire harness clip to be minimized when a wire harness is pulled. The wire harness fixing structure is configured to fix the wire harness to a panel using a wire harness clip. The wire harness clip includes a plate composed of a base portion and a pair of extension portion extending in a direction away from both ends in a length direction of the base portion. The pair of extension portion is formed narrower than the base portion. The plate and the wire harness are covered with an self adhesive sheet, and fixed. The latched part being latched in a hole of the panel allows the adhesive sheet between the plate and the panel to be pressured and adhered to an outer circumference of the hole.

12 Claims, 12 Drawing Sheets

(56) References Cited

U.S. PATENT DOCUMENTS

| | | | |
|---|---|---|---|
| 6,311,934 B1* | 11/2001 | Fujii | F16L 3/04 248/74.1 |
| 6,683,258 B1* | 1/2004 | Tracy | H02G 3/30 174/135 |
| 7,045,715 B2* | 5/2006 | Ono | B60R 16/0215 174/72 A |
| 2001/0023778 A1 | 9/2001 | Kondoh | |
| 2014/0151116 A1* | 6/2014 | Doshita | H02G 3/32 174/70 R |

\* cited by examiner

WIRE HARNESS FIXING STRUCTURE

CROSS REFERENCE TO RELATED APPLICATIONS

This application is related to co-pending application: "WIRE HARNESS SECURING STRUCTURE" filed even date herewith in the names of Kenichi Doushita, Mitsunori Tsunoda and Kouhei Niiho as a national phase entry of PCT/JP2013/002918, which application is assigned to the assignee of the present application and is incorporated by reference herein.

TECHNICAL FIELD

This invention relates to wire harness fixing structures for fixing wire harnesses to panels using wire harness clips.

BACKGROUND ART

FIGS. 16A to 16C are explanatory views of a wire harness fixing structure for fixing a wire harness to a fixed member using conventional wire harness clip.

The wire harness fixing structure shown in FIGS. 16A to 16C is such a structure for attaching the wire harness 202 to the fixed member 201 such as a body of a vehicle, various devices, or a panel, and is provided with a wire harness clip 203 to be latched in a latching hole 201a of the fixed member 201, and a fixing film 204 for holding the wire harness clip 203.

The above mentioned wire harness clip 203 is formed of synthetic resin, and is provided with an anchor 203a latched in the latching hole 201a of the fixed member 201, a plate 203b formed into plate-like shape.

A tip of the above mentioned anchor 203a is provided with a first latched piece 203c and a second latched piece 203d. The anchor 203a is inserted into the latching hole 201a of the fixed member 201, the first latched piece 203c and the second latched piece 203d are thus deformed elastically to contract, and the first latched piece 203c and the second latched piece 203d, after passing through the latching hole 201a, are restored and latched in the latching hole 201a.

The fixing film 204 is such a heat contraction film that is formed of such polyolefin series resin or chloroethene series resin, in which a though hole 204a through which the anchor 203a is passed is formed.

When the wire harness 202 is fixed to the fixed member 201 using the above mentioned wire harness clip 203 and the fixing film 204, as shown in FIG. 16A, the anchor 203a of the wire harness clip 203 is first inserted into the through hole 204a of the fixing film 204, and the wire harness clip 203 is fixed to the fixing film 204 with the plate 203b abutted onto the fixing film 204.

Then, as shown in FIG. 16B, the wire harness 202 is arranged on a middle of the fixing film 204, and the fixing film 204 is folded back frontward in such a way as to wrap around the wire harness 202. Then, after stacked portion of the fixing film 204 is adhered, welded, or thermal compression bonded, the fixing film 204 is heated and contracted so as to fix the wire harness clip 203 and the wire harness 202.

Then, as shown in FIG. 16C, the anchor 203a of the wire harness clip 203 is latched in the latching hole 201a of the fixed member 201, which allows the wire harness 202 to be fixed to the fixed member 201 (see PTL 1).

FIG. 17 is a perspective view illustrating other conventional wire harness clip. FIG. 18 is a plane view illustrating a state of the wire harness shown in FIG. 17 being fixed to the wire harness. FIG. 19 is a cross-sectional view illustrating a state of the latched part of the wire harness clip shown in FIGS. 17 and 18 being press-fitted and latched into a hole of the panel.

A wire harness clip 300 shown in FIGS. 17 to 19 is such a structure as to fix a wire harness 2 (see FIG. 18), formed such that a plurality of wire harnesses 2a is bound together, to a panel 3 (see FIG. 19), which is provided with a clip main body 301 formed of synthetic resin and a packing 302 mounted to the clip main body 301.

The above mentioned clip main body 301 is elongated plate-like shaped, which is provided with a plate 310 following the wire harness 2, a latched part 311 press-fitted and latched in a hole 3a of the panel 3, and a blade 315 to be attached to the packing 302.

The above mentioned latched part 311 is provided with a pillar 312 upstanding from the middle of the plate 310, and a pair of latched pieces 313 extending toward the plate 310 from a top of the pillar 312. A tip of each latched piece 313 is provided with a step-like latching shoulder 314 formed. The latched part 311 is press-fitted from the the tip of the pillar 312 into the hole 3a of the panel 3, and is latched in the hole 3a by each latching shoulder 314 of the pair of latched pieces 313 engaging to the edge of the hole 3a.

The blade 315 is formed into plate-like shape around a base end of the pillar 312, which involves elasticity.

The packing 302 is attached to a surface of the blade 315 at the side of panel 3, provided with a hole 320 in the middle that passes the latched part 311 therethrough. This packing 302 adheres to an outer circumference of the hole 3a by the latched part 311 being press-fitted to be latched in the hole 3a of the panel 3, preventing water or dust from penetrating inside the panel 3 from the hole 3a (near the plate 310 in FIG. 19).

When the wire harness 2 is fixed to the panel 3 using the above mentioned wire harness clip 300, as shown in FIG. 18, the plate 310 follows the wire harness 2, around which a tape 309 is wound to fix, and subsequently the latched part 311 is press-fitted in the hole 3a of the panel 3, allowing the wire harness 2 to be fixed to the panel 3.

CITATION LIST

Patent Literature

[PTL 1]
Japanese Patent Application Laid-Open Publication No. 2007-259604

SUMMARY OF INVENTION

Technical Problem

Disadvantageously, the wire harness fixing structure using the aforementioned clip 203, or 300 has posed drawbacks below.

I.e., in the wire harness fixing structure using the wire harness clip 203, the plate 203b is formed smaller than the though hole 204a or the latching hole 201a, and the fixing film 204, i.e., heat contraction film generally involves poor elasticity or strength, posing drawbacks that when the wire harness 202 is exerted with so large force as to be strained with the anchor 203a latched in the latching hole 201a, load is concentrated near the plate 203b in the fixing film 204, causing the fixing film 204 to tear so as to disengage from the plate 203b, and resulting in the wire harness 202 likely dropping off. Furthermore, the fixing film 204. i.e., the heat contraction film generally involves poor elasticity, making it difficult to adhere tightly to the outer circumference of the latching hole 201a without any space, and making it impossible to employ this wire harness fixing structure when required of sealing.

Furthermore, in the wire harness fixing structure using the wire harness clip 300, the wire harness 2 is attached to just below the latched part 311, i.e., wiring path for the wire harness 2 is just below the latched part 311, requiring that when objects are positioned on an extension of this path, it is necessary to divert the wire harness 2 so largely as not to interfere with the objects, consequently posing drawbacks of increase in cost incurred by the wire harness 2 getting long. Furthermore, because the plate 310 is required to be long enough to obtain good workability of winding tape, there has been posed drawbacks of likely interfering with objects when the objects are positioned near the hole 3a of the panel 3.

Furthermore, there has been posed drawbacks below in the wire harness fixing structure using the wire harness clip 300. I.e., since the plate 310 involves some stiffness in order to obtain good workability of winding tape, when such large force is exerted on the wire harness 2 as the wire harness 2 is strained, this force likely propagates to the latched part 311, causing the latched part 311 to be deformed or damaged so that the wire harness 2 drops off from the panel 3.

Furthermore, since the wire harness clip 203 is formed such that the width of the plate 310 is shaped uniformly across its length, when such large force is exerted thereon as the wire harness 2 is strained, and the both ends of the plate 310 thus elastically deformed, the elastic deformation likely penetrates to the middle of the plate 310, posing drawbacks that adhesiveness of the packing 302 to the panel 3, i.e., sealing becomes reduced due to the deformation in the middle getting large.

Furthermore, since the wire harness clip 203 is also formed such that the width of the plate 203b is shaped uniformly across its length, when such large force is exerted thereon as the wire harness 2 is strained, and the both ends of the plate 203b thus elastically deformed, posing drawback, as is the case of the wire harness clip 300, that deformation of the middle of the plate 203b gets large.

Therefore, in view of the drawbacks as mentioned above an object of the present invention is to provide a wire harness clip structure making deformation of the middle of the plate reduced when the wire harness is strained, and preventing the wire harness from dropping off from the panel.

Solution to Problem

According to an aspect of the invention to achieve the above mentioned object, there is provided a wire harness fixing structure for fixing a wire harness to a panel, comprising: a wire harness clip used for fixing the wire harness to the panel, including a plate, both ends of the plate in a length direction thereof being formed narrower than a middle of the plate, and a latched part disposed in the middle of the plate, press-fitted and latched in a hole disposed in the panel; and an adhesive sheet covering and fixing the plate and the wire harness.

Preferably, the plate is composed of a plate-like base portion arranged at the middle of the plate, and a pair of extension portion extending from the both ends in the length direction in a direction away from each other, wherein the pair of extension portion is formed narrower than the base portion.

Preferably, the plate is formed gradually narrower as approaching from the middle of the plate to the both ends in the length direction.

Preferably, the pair of the extension portion is formed shorter than the base portion in the length direction.

Preferably, the latched part is provided with a pillar upstanding from the plate, a latched piece extending from a top of the pillar, wherein a tip of latched piece is engaged with an edge of the hole of the panel, and wherein the pillar is provided with a through hole.

Preferably, an inner face of the through hole, with the latched part press-fitted and latched in the hole of the panel, is positioned as far as, or farther than, an opposite side of the panel opposite to the plate in a separating direction from the plate.

Preferably, the adhesive sheet is formed elastically so as to contract upon its being pressed, and restore a thickness thereof upon its being released from being pressed, wherein the adhesive sheet is provided with a through hole passing the latched part therethrough, and wherein the latched part being latched in the hole of the panel allows the adhesive sheet between the plate and the panel to be compressed, and adhered to an outer circumference of the hole.

Advantageous Effects of Invention

According to the aspect of the invention, since the wire harness clip includes the plate and the latched part disposed in the middle of the plate, press-fitted and latched in the hole of the panel, both ends of the plate in the length direction thereof is formed narrower than the middle, and the plate and the wire harness are covered with the adhesive sheet so as to be fixed, even though deformation of the adhesive sheet as by the wire harness being strained causes to put load on both ends of the plate, the deformation of the both ends of the plate unlikely propagates to the middle, allowing the deformation of middle or the latched part to reduce. Therefore, it is made possible to provide the wire harness fixing structure preventing the wire harness from dropping off from the panel.

Furthermore, according to the invention, since the plate is composed of the plate-like base portion arranged at the middle of the plate, and the pair of extension portion extending in the direction separating from each other from the both ends in the length direction, and the pair of extension portion is formed narrower than the base portion, even though deformation of the adhesive sheet as by the wire harness being strained causes to put load on both ends of the plate, i.e., the pair of extension portion, the deformation of the extension portion unlikely propagates to the middle of the plate, i.e., the base portion, which makes the deformation of the base portion and the latched part reduce. Therefore, it is made possible to provide the wire harness fixing structure preventing the wire harness from dropping off from the panel.

Furthermore, since the plate is formed gradually narrower as approaching to the both ends in the length direction from the middle of the plate, contact area of the plate and the adhesive sheet becomes large, enhancing preventing water or dust from penetrating into the plate from the hole of the panel.

Furthermore, since the length of the pair of the extension portion in the wire harness fixing structure is formed shorter than that of base portion, it is made possible to facilitate workability of wiring even though objects are located near the hole of the panel without the plate interfering with the objects.

Furthermore, since the latched part is provided with the pillar upstanding from the plate, the latched piece extending from the top of the pillar, the tip of latched piece is engaged with an edge of the hole of the panel, and the pillar is provided with the through hole, it is made possible to prevent collection of water on the surface of the pillar and penetration of this water into the plate from the hole of the plate running along the surface of the pillar.

Furthermore, since the inner face of the through hole is positioned, with the latched part press-fitted and latched in the hole of the panel, as far as, or farther than, an opposite side of the panel opposite to the plate, it is made possible to prevent penetration of such water into the plate from the hole of the plate.

Furthermore, since the adhesive sheet is formed so elastic as to contract upon being pressed, and restore a thickness thereof upon a press being released, the adhesive sheet is provided with a through hole passing the latched part therethrough, and the latched part being latched and latched in the hole of the panel allows the adhesive sheet between the plate and the panel to be compressed and adhered tightly to the outer circumference of the hole, it is made possible, in addition to the outcome in the above mentioned aspect, to provide the wire harness fixing structure excelling at sealing against the hole of the panel.

DESCRIPTION OF EMBODIMENTS

A First Embodiment

Figure 1:
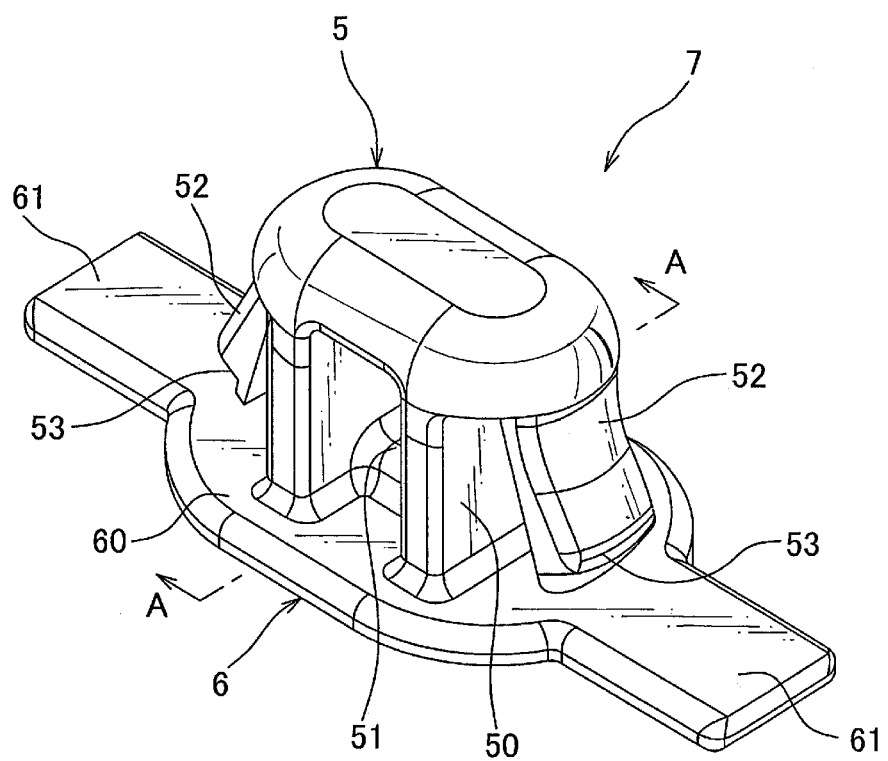
FIG. 1 is a perspective view illustrating a wire harness clip composing a wire harness fixing structure according to the first embodiment of the invention.

A "wire harness fixing structure" according to the first embodiment of the invention is described with reference to FIGS. 1 to 9.

The "wire harness fixing structure 1" is a structure for fixing wire harness 2 to a panel 3 using a wire harness clip 7, and a self adhesive sheet 4 (corresponding to "adhesive sheet" in the claims).

The wire harness 2 is such one as is wired in an automobile, composed of a plurality of electric wires 2a being bound. Also, in the invention the wire harness may be composed of one electric wire.

Figure 7:
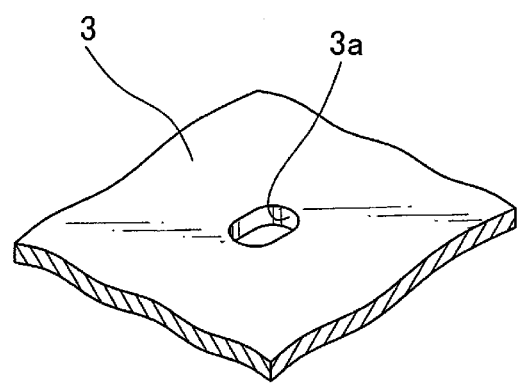
FIG. 7 is a perspective view illustrating a panel composing the wire harness fixing structure according to the first embodiment of the invention.
Figure 9:
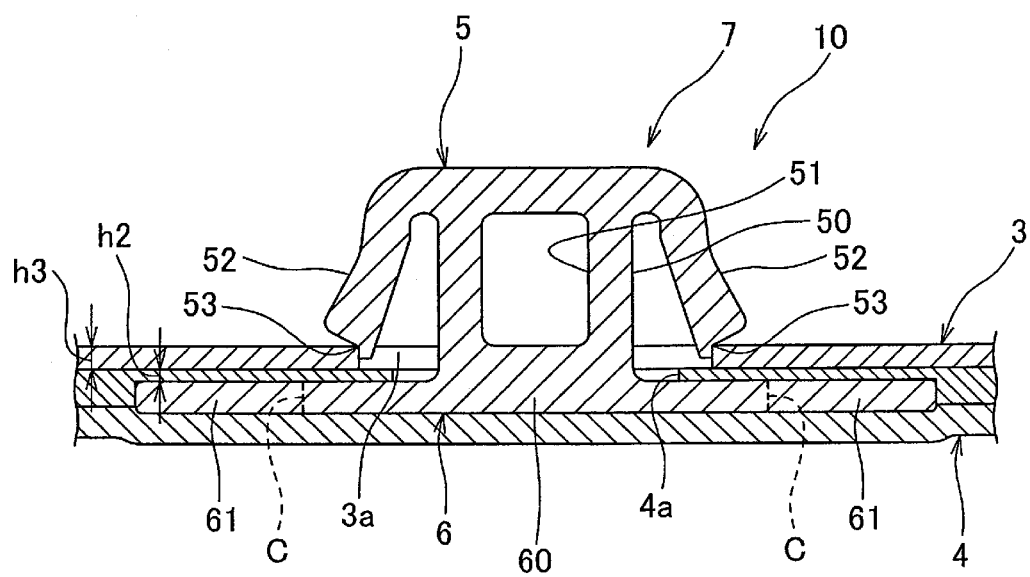
FIG. 9 is a cross-sectional view illustrating a state that the latched part of the wire harness fixing structure shown in FIG. 8 is press-fitted in the hole of the panel.

The panel 3 is a car body panel of an automobile. This panel 3 has an elliptical hole 3a formed as shown in FIGS. 7, and 9. Also, in FIG. 9 an upper side of the panel 3 corresponds to an outside of the vehicle, a lower side of the panel 3 an inside of the vehicle.

The wire harness clip 7 is composed of synthetic resin, includes as shown in FIGS. 1 to 4, integrally a plate 6 composed of plate-like base portion 60, a pair of extension portions 61 extending in a direction separating from both ends of the base 60 in its longitudinal direction, and a latched part 5 disposed in the base portion 60, to be press-fitted in the hole 3a of the panel 3. I.e., the base portion 60 is positioned in the middle of the plate in the longitudinal direction.

Figure 2:
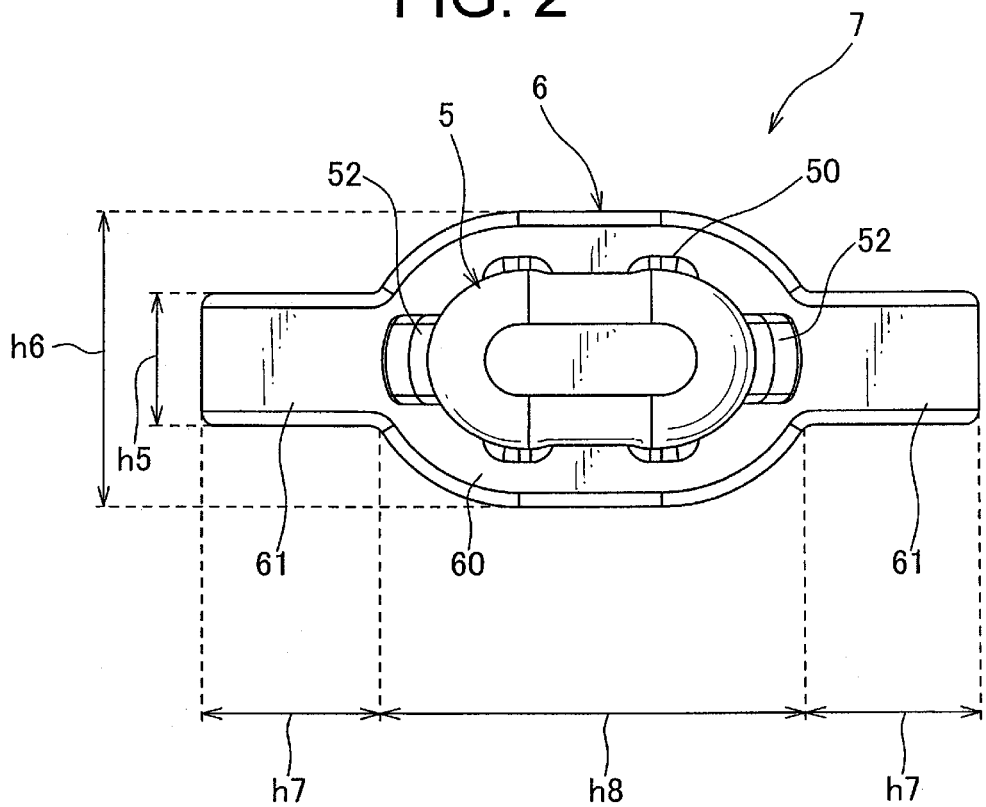
FIG. 2 is a plane view illustrating the wire harness clip shown in FIG. 1.

The pair of extension portion 61 is as shown in FIG. 2, formed such that its length (shown by h7 in FIG. 7) is arranged smaller than that of the base portion 60 (shown by h8 in FIG. 2), and that its width (shown by h5 in FIG. 2) is arranged smaller than that of the base portion 60 (shown by h6 in FIG. 2). Namely, the width of the both ends of the plate in the longitudinal direction is formed smaller than that of the middle of the plate 6 in the longitudinal direction.

The base portion 60 is formed such that its four corners are made round, and made elliptical viewed planarly. The base portion 60 is formed elliptical larger than the hole 3a of the panel 3.

Figure 3:
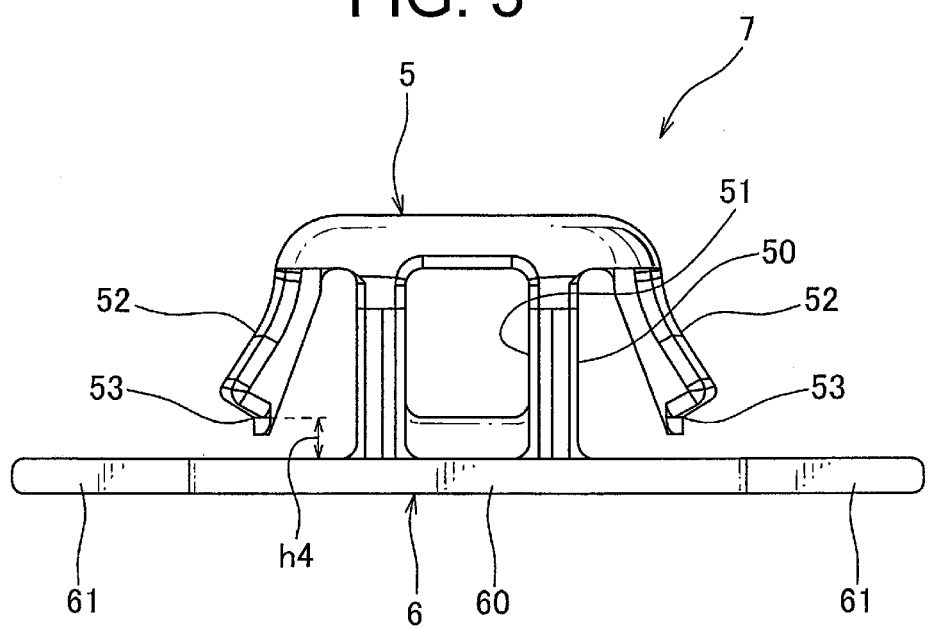
FIG. 3 is a front view illustrating the wire harness clip shown in FIG. 1.
Figure 4:
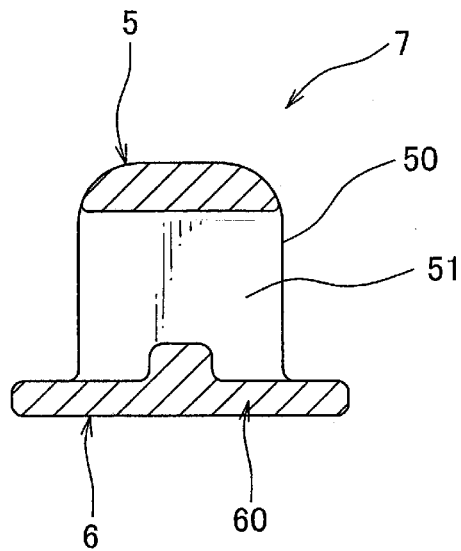
FIG. 4 is a cross-sectional view taken along A-A line in the FIG. 1.

The latched part 5 is, as shown in FIG. 3, provided with a pillar 50 upstanding from a surface of the base portion 60 near the panel 3, and a pair of latched pieces 52 extending from a top of the pillar 50 toward the base 60. The pair of latched parts 52 extends in a direction inclined to an upstanding direction of the pillar 50 in such a way as to separate gradually from each other as approaching from the top of the pillar 50 to the base portion 60. At a tip of each latched piece a stepwise latching shoulder 53 is formed. The pillar is provided with a drainage hole 51 (corresponding to "a through hole" in the claims). The drainage hole 51 passes through the pillar 50 in a width direction of the base portion 60.

Such latched part 5 is press-fitted in the hole 3a of the panel 3 from the tip of the pillar 50, and is latched in the hole 3a by each latching shoulder 53 of the pair of latched pieces 52 being engaged in an edge of the hole 3a. At this time the pair of latched pieces 52 is, while deformed in a direction approaching to each other, inserted into the hole 3a of the panel 3, then as restored to some extent in a state before deformation, each latched part 53 is engaged in the edge of the hole 3a. Also, the latched part of the invention may not necessarily include one pair of latched pieces 52 but may include at least one latched piece 52.

Figure 5:
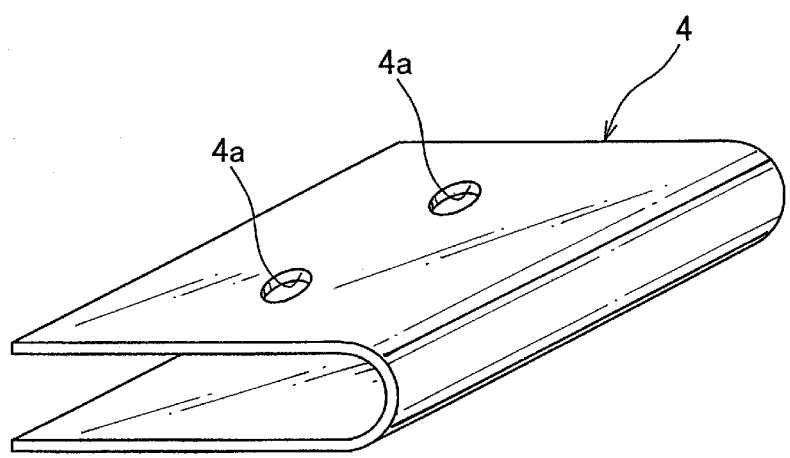
FIG. 5 is a self adhesive sheet composing the wire harness fixing structure according to the first embodiment of the invention.
Figure 6:
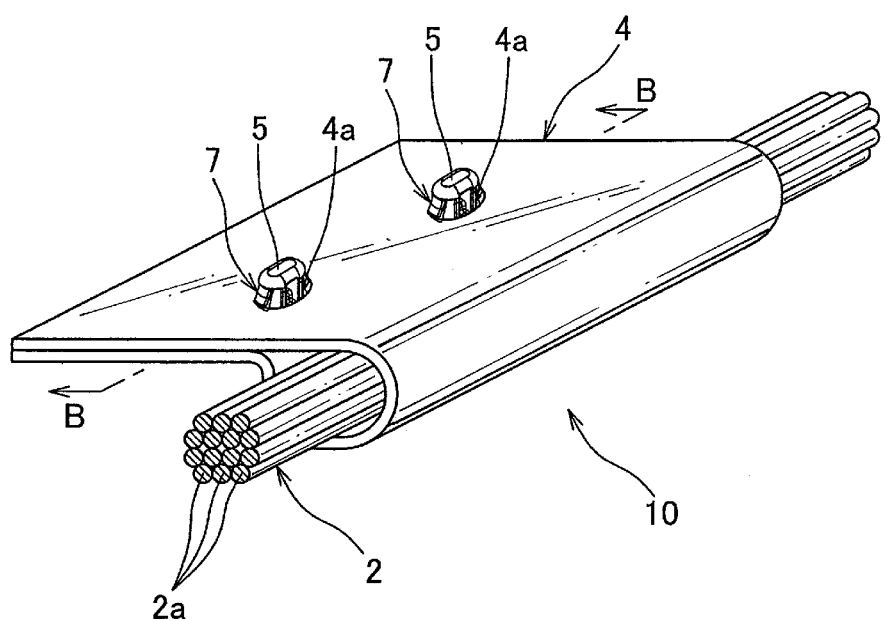
FIG. 6 is a perspective view illustrating a state that the wire harness clip shown in FIG. 1 is covered along with the wire harness by the self adhesive sheet.

The plate 6 of the wire harness clip 7 and the wire harness 2 are fixed by being covered by the self adhesive sheet 4 shown in FIG. 5. In the embodiment, as shown in FIG. 5, the plate 6 and the wire harness 2 are, while arranged separated from each other and in parallel, fixed via the self adhesive sheet 4. Also in the present invention the plate 6, while following the wire harness 2, is fixed to the wire harness 2.

Herein, what the wire harness clip 7 and the wire harness 2 are fixed by the self adhesive sheet 4 is called "a wire harness with clip", provide with reference sign 10.

The self adhesive sheet 4 is the one in which its one side is made adhesive. This self adhesive seat 4 has self adhesive that each is adhered to each other by each adhesive face being stacked to each other. But the adhesive face is designed not to adhere to other member such as the wire harness clip 7 or the wire harness 2. Furthermore, the self adhesive seat 4 is provided with a through hole 4a passing the latched part 5 therethrough. This through hole 4a is made elliptical and smaller in diameter than the hole 3a of the panel 3.

The self adhesive sheet 4 also provides elasticity which is contracted in its width direction when pressed, and which is restored in its thickness when released from the pressure, and what provides waterproof on the adhesive face and the opposite face with its being pressed is adapted. Also, in this embodiment, adapted as the self adhesive sheet 4 is such material as polypropylene form material, and its thickness of 2.40 mm (shown by h1 in FIG. 8).

The self adhesive sheet 4 also provides elasticity mentioned above, and may be thus made to employ self adhesive sheet other than polypropylene form material as far as exhibiting waterproof upon contraction, for example, rubber, elastomer, or other synthetic resins. This embodiment employs not only adhesive sheet but also various adhesive sheets such as what adhesive is applied to, but it is desired, if required of sealing for the hole 3 of the panel, to employ above-described adhesive sheet providing elasticity and waterproof upon contraction.

When using such self adhesive sheet by which the wire harness clip 7 and the wire harness 2 are fixed, the latched part 5 is first passed through the through hole 4a, and the self adhesive sheet 4 is attached to the wire harness clip 7, then the wire harness 2 is covered by the self adhesive sheet 4. Also, in this embodiment, the self adhesive sheet 4 is folded in two, the wire harness 2 is positioned where the self adhesive sheet 4 is folded, and both ends of the adhesive sheet 4 are stacked with each other, therefore, entire the plate 6 and the wire harness 2 are covered and fixed to each other.

Thus, in the invention, since the adhesive sheet 4 is provided with the through hole 4a configured to pass the latched part 5 therethrough, it is made possible readily to work covering the plate 6 and the wire harness 2 with the self adhesive sheet 4, and to provide the wire harness 1 with clip and the wire harness fixing structure 1 that induces less variation in quality.

Also, in the present invention, when the wire harness clip 7 and the wire harness 2 are covered with the self adhesive sheet 4, a space between the wire harness clip 7 and the wire harness 4 is made desirable, and it is thus made possible to optimize wiring path for the wire harness 2. Accordingly, it is made possible readily to work wiring the wire harness 2.

Figure 17:
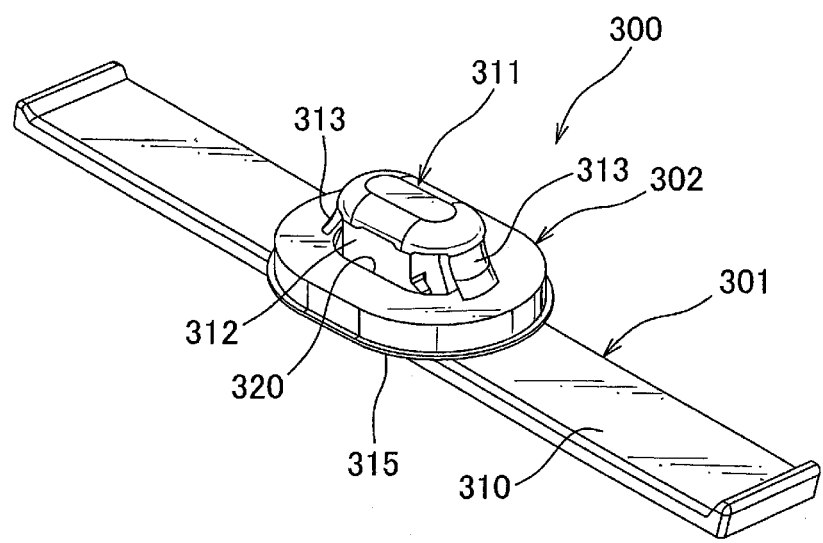
FIG. 17 is a perspective view illustrating another conventional wire harness clip.
Figure 18:
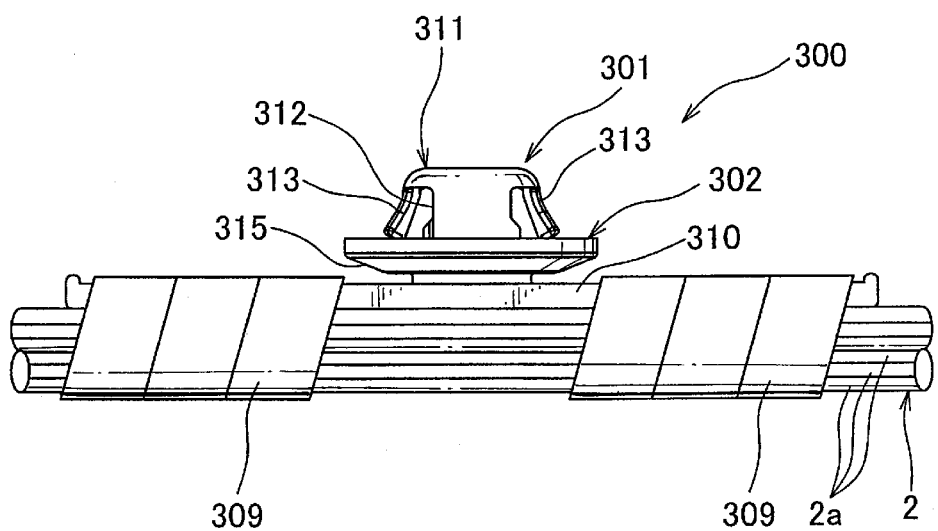
FIG. 18 is a front view illustrating a state that the wire harness clip shown in FIG. 17 is fixed to the wire harness.
Figure 19:
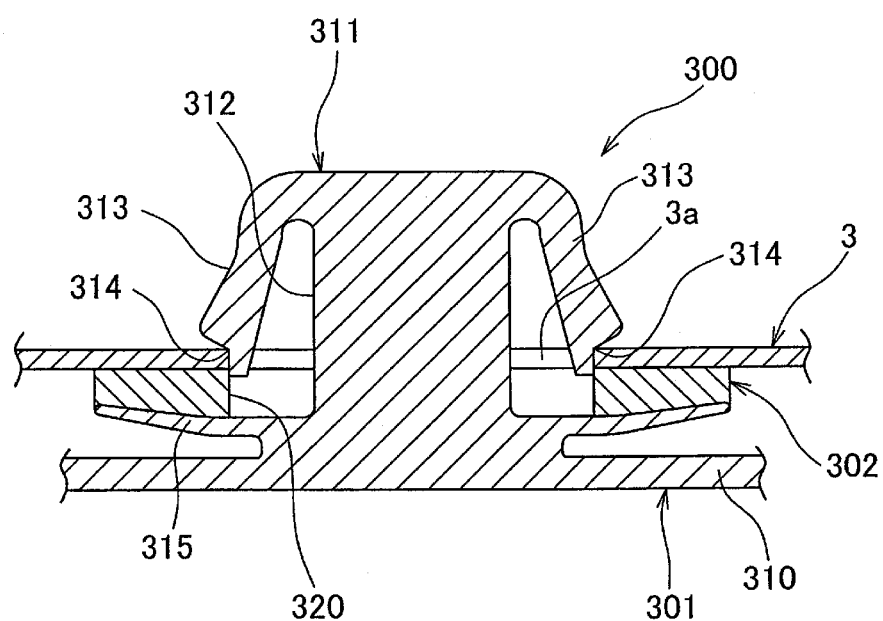
FIG. 19 is a cross-sectional view illustrating a state that the latched part of the wire harness clip shown in FIGS. 17 and 18 is press-fitted in the hole of the panel.

Furthermore, since the wire harness fixing structure 1 of the present invention is such a structure that the wire harness clip 7 is covered with the self adhesive sheet 4, it is made possible to avoid making the plate 6 long in view of workability of wiring tape as is conventional wire harness clip (see FIGS. 17 to 19), making its length shorter than the conventional one. Therefore, even though objects are placed near the wire harness 2, the plate 6 may interfere therewith, making it possible readily to work wiring the wire harness 2. Note that the wire harness clip 7 in the present invention, has the plate 6 shorter than three times the base portion 60 in length. On the other hand, the conventional wire harness clip in which tape is wound around the plate requires the plate to be longer than three times the base portion (in the case of the wire harness clip shown in FIG. 18, it is required that entire the plate is three times longer than the blade part 315).

The wire harness 10 with clip thus assembled by entire the plate 6 and the wire harness 2 being covered with the self adhesive sheet 4 is fixed to the panel 3 by the latched part 5 of the wire harness clip 7 being press-fitted in the hole 3a of the panel 3, and by the plate 3 being sandwiched and held between the pair of latched pieces 52 and the plate 6.

Figure 8:
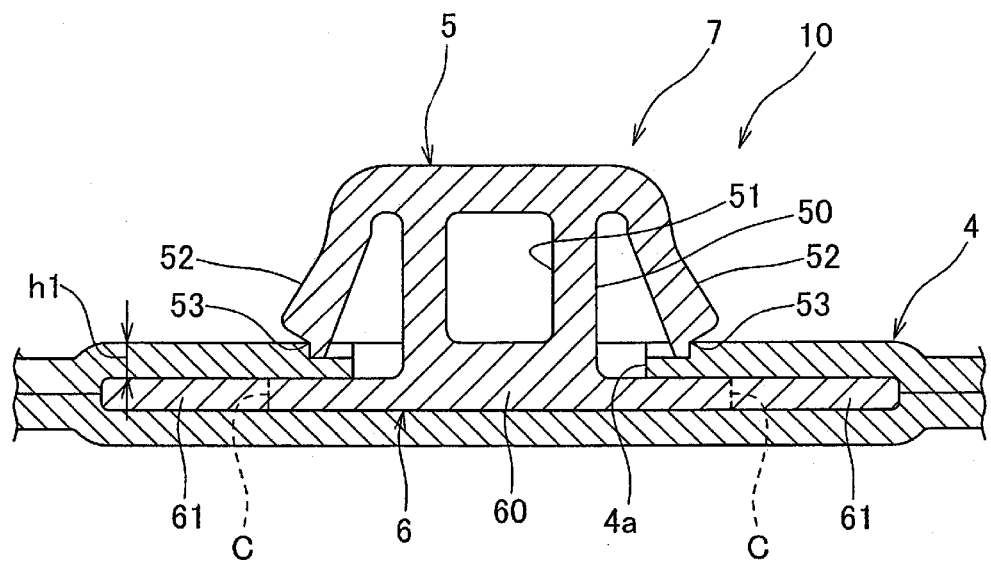
FIG. 8 is a cross-sectional view taken along B-B line in the FIG. 6.

Also, shown in FIG. 8, in a state before the latched part 5 is press-fitted in the hole 3a of the panel 3, a surface of the self adhesive 4 near the panel 3 is in elastic contact with the latching shoulder 53 at the tip of the pair of latched parts 52. As shown in FIG. 9 the latched part 5 is press-fitted in the hole 3a of the panel 3 so that the latching shoulder 53 at the tip of the pair of latched pieces 52 is engaged in the edge of the hole 3a, and thus the self adhesive sheet 4 between the plate 6 and the panel 3 is contracted in a direction separating from the latching shoulder 53 so as to adhere to the outer circumference of the hole 3a. It follows from this that sealing to the hole 3a of the panel 3 is kept well. Accordingly, it is made possible to prevent water or dust from penetrating inside the vehicle from the outside.

That is, in the wire harness fixing structure 1, the self adhesive sheet 4 between the plate 6 and the panel 3 is contracted to such extent as by at least its thickness. Furthermore, in the present invention, a space between the latching shoulder 53 and the base portion 60 (shown by h4 in FIG. 3) is formed 1.35 mm, thickness of the panel 3 0.70 to 0.80 mm (shown by h3 in FIG. 9), thickness of the self adhesive sheet 4 after contracted (shown by h2 in FIG. 9) 0.55 to 0.65 mm. That is, the self adhesive sheet 4 is contracted by 1.75 to 1.85 mm because the thickness of the self adhesive sheet 4 before contracting is formed 2.40 mm.

Furthermore, in the present invention, since the width of the pair of extension portions 61 of the wire harness clip 7 is formed smaller than that of the base portion 60, when the self adhesive sheet 4 is deformed by the wire harness 2 being strained with the latched part 5 press-fitted in the hole 3a of the panel 3 (a state of FIG. 9), and on the both ends of the plate 6, i.e., the pair of extension portions 61 a load is placed, elastic deformation of the pair of extension portions 61 is unlikely propagated to the middle of the plate 6, i.e., the base portion 60, thus making it possible to reduce the deformation of the base portion 60.

Thus, since the present invention allows the deformation of the base portion 60 to reduce, it is also made possible to reduce deformation of the latched part 5 in continuous with the base portion 60, preventing the wire harness 2 from dropping out of the panel 3 by the latched part 5 being released from the hole 3a of the panel 3. Also, as shown in FIG. 9, since the base portion is where the self adhesive sheet 4 is pressed to the outer circumference of the hole 3a of the panel 3 (dotted line C in FIG. 9 shows both ends of the base portion 60), it is made possible to reduce the deformation of the base 60, keeping well the sealing to the hole 3*a* of the panel 3.

Also, in the present invention, since the pillar 50 of the wire harness clip 7 is provided with the drainage hole 51, it is made possible to prevent water (washing water or rain) from collecting on the surface of the pillar 5, and this water from penetrating inside the vehicle from the hole 3*a* of the panel 3 following the surface of the pillar 50. Also, in the present invention, the pair of latched pieces 52 is placed separated from each other in a horizontal direction with the latched part 5 press-fitted in the hole 3*a* of the panel 3, and the drainage hole 51 passes through the pillar 50 in a vertical direction. It is thus preferable in the present invention the drainage hole 51 passes through the pillar 50 in the vertical direction with the latched part 5 press-fitted in the hole 3*a* of the panel 3.

Also, while in the above mentioned embodiment, the plate 6 and the wire harness 2 are covered with the self adhesive sheet 4 with its being folded in two, it is also preferred that in the wire harness fixing structure of the present invention, using more than one self adhesive sheets, by adhering the self adhesive sheets 4 to each other the plate 6 and the wire harness 2 may be covered. Also in this case, the same outcome is achieved as the self adhesive sheet 4 is folded in two.

A Second Embodiment

"A wire harness fixing structure" according to the second embodiment of the present invention is described with reference to FIGS. 10 to 15. In FIGS. 10 to 15, the same elements is provided with the same reference signs as the first embodiment mentioned above and description thereof is not repeated herein.

Figure 14:
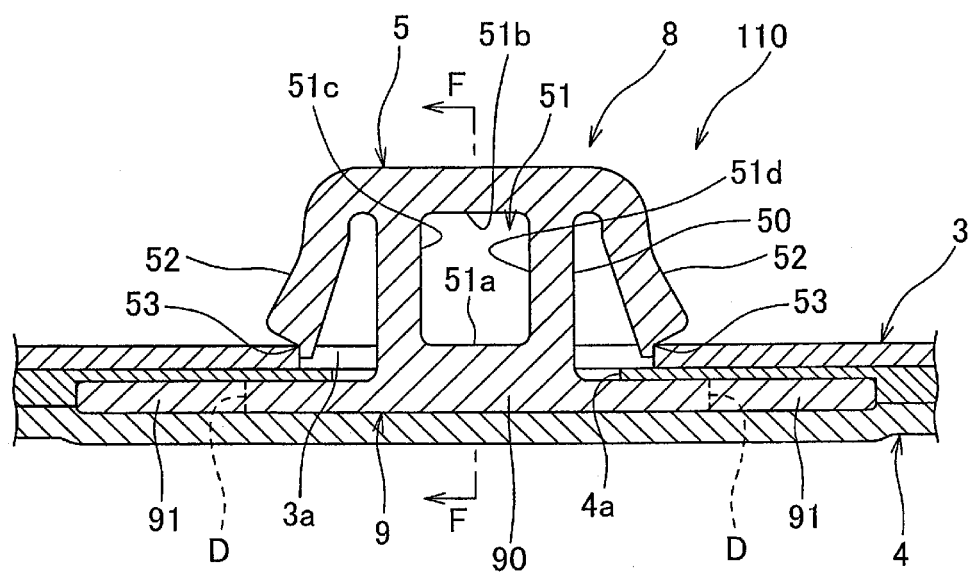
FIG. 14 is a cross-sectional view illustrating a state that the latched part of the wire harness fixing structure shown in FIG. 13 is press-fitted in the hole of the panel.

"The wire harness fixing structure" of the present invention shown in FIG. 14 is such a structure as to fix the wire harness to the panel 3 using a wire harness clip 8, and a self adhesive sheet 4 (corresponding to "adhesive sheet" in the claims).

The wire harness is omitted to be illustrated herein, but is configured in the same structure as the wire harness 2 described in the first embodiment. Likewise, the panel 3 and the self adhesive sheet 4 mentioned above are configured in the same structure as those described in the first embodiment.

Figure 10:
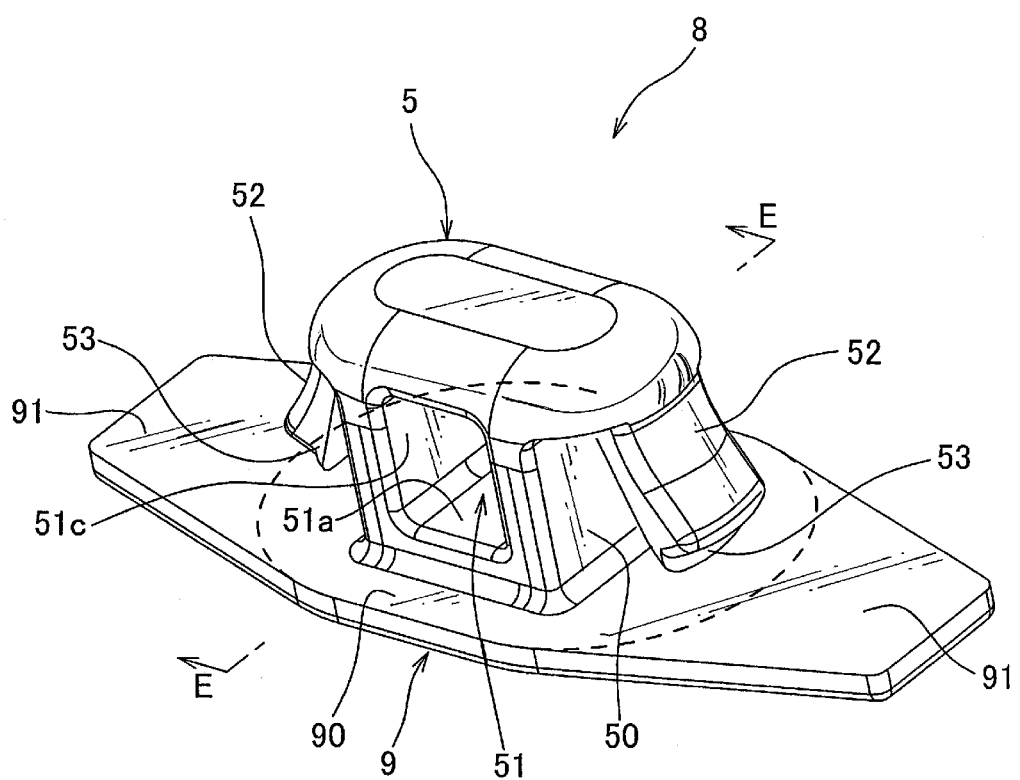
FIG. 10 is a perspective view illustrating the wire harness clip composing the wire harness fixing structure according to a second example of the present invention.
Figure 11:
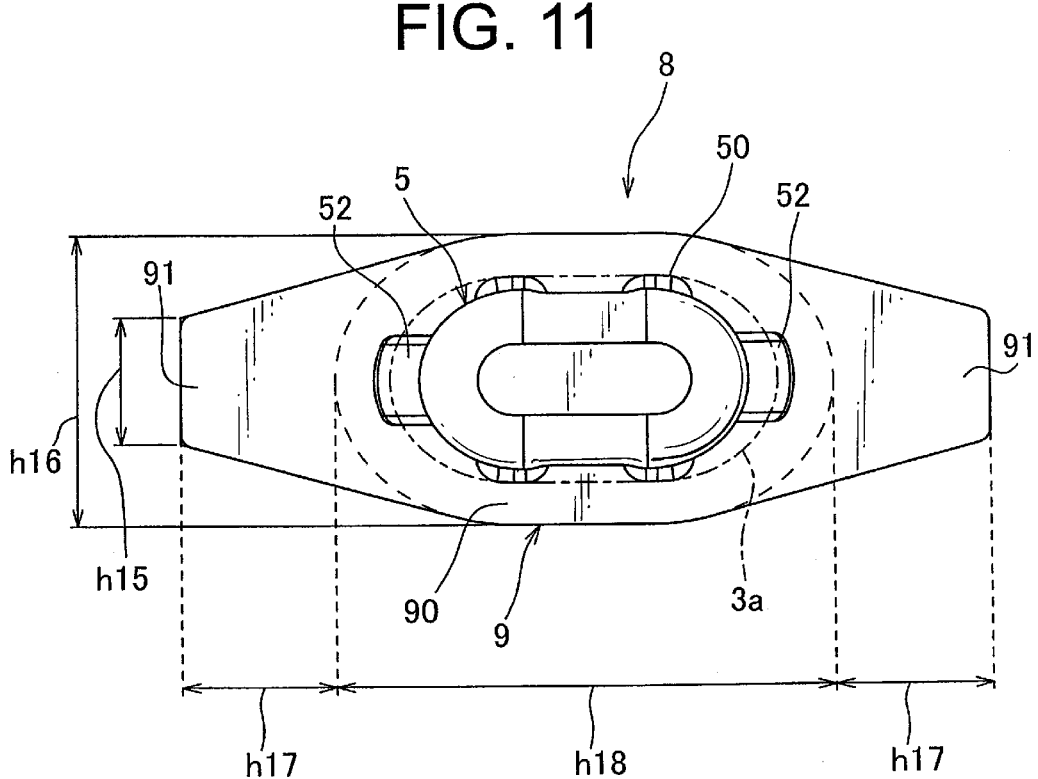
FIG. 11 is a plane view of the wire harness clip shown in FIG. 10.

The wire harness clip 8 is formed of synthetic resin, and as shown in FIGS. 10 to 13, is provided integrally a plate 9 including a base portion 90 in a plate-like elliptical shape planarly viewed and a pair of circumferential portions 91 extending from both ends of the base portion 90 in its length direction toward a direction separating from each other, and a latched part 5 disposed in the base portion 90, configured to be press-fitted in the hole 3*a* of the panel 3. That is, the base portion 90 is positioned in the middle of the plate 5 in its length direction. Dotted line in FIGS. 10 and 11 is a virtual line showing outer edge of the base portion 90. The base portion 90 is also formed into ellipse larger than the hole 3*a* of the panel 3. Dashed line in FIG. 11 is a virtual line showing a size and a shape of the hole 3*a* of the panel 3.

The plate 9 is formed so as to become narrower gradually as approaching from the middle in its length direction, i.e., the middle of the base portion 90, to the both ends in its length direction, i.e., end sides away from the base portion 90 of the pair of circumferential portions 91. As such, width of the both ends in its length direction, i.e., end sides away from the base portion 90 of the pair of circumferential portions 91 (shown by h15 in FIG. 11) is arranged smaller than that of the middle in its length direction, i.e., the middle of the base portion 90 (shown by h16 in FIG. 11). Thus, the plate 9 is boat-shaped planarly viewed. The length from the both ends of the base portion 90 to the end sides away from the base portion 90 of the pair of circumferential portions 91 (shown by h17 in FIG. 11) is formed smaller than that of the base portion 90. i.e., the length of the base portion 90 in its length axis (shown by h18 in FIG. 11).

The latched part 5, as is the case with the first embodiment, is provided with a pillar 50 upstanding from the surface of the base portion 90 near the panel 3, a pair of latched pieces 52 extending from the top of the pillar 50 to the side near the base portion 90. The pair of latched pieces 52 extends in a diagonal direction relative to upstanding direction of the pillar 50 such as to separating from each other gradually as approaching from the top of the pillar 50 to the side near the base portion. At the tip of each latched pieces 52 a stepwise latching shoulder 53 is formed. In the pillar 50 a drainage hole 51 is formed (corresponding to "through hole" in the claims).

Figure 12:
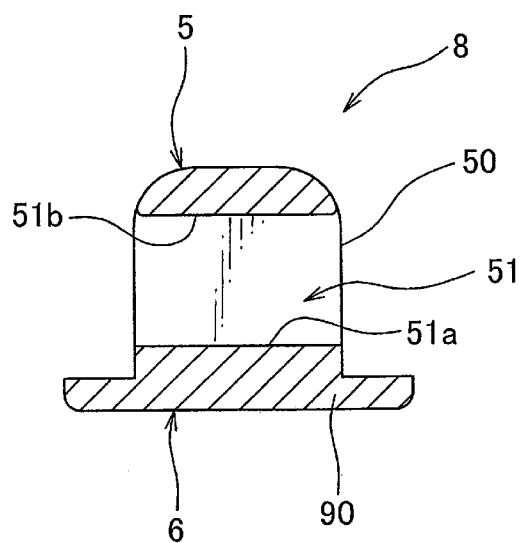
FIG. 12 is a cross-sectional view taken along E-E line in the FIG. 10.
Figure 13:
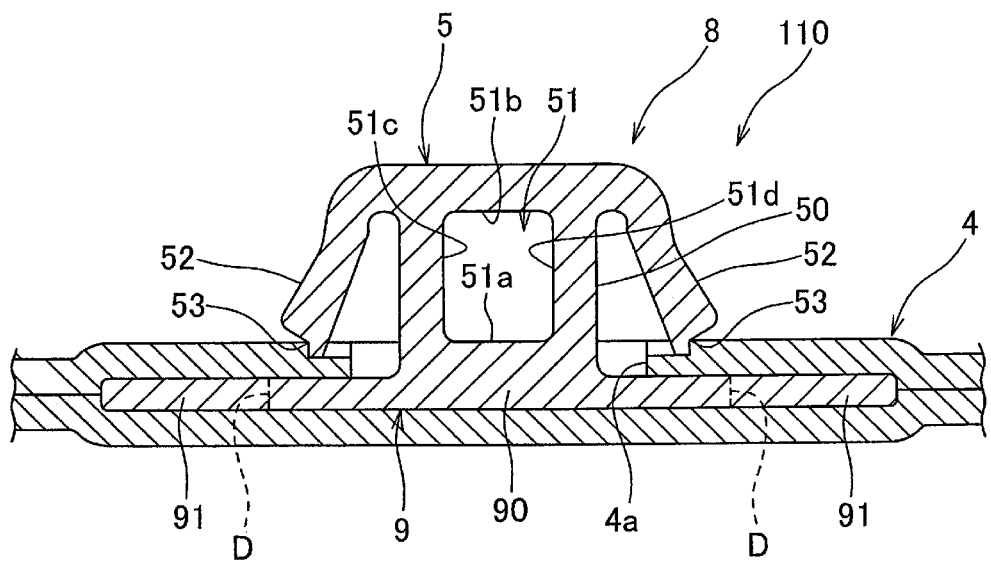
FIG. 13 is a perspective view illustrating a state that the wire harness clip shown in FIG. 10 is covered by the self adhesive sheet.

The drainage hole 51 is, as shown in FIGS. 10, 12, and 13, passes through the pillar 50 in a width direction of the base portion 90. The drainage hole 51 is also provided with two flat inner faces 51*a*, 51*b* opposite to each other in the upstanding direction of the pillar 50, and two flat inner faces 51*c*, 51*d* opposite to each other in the length direction of the pillar 50.

The plate 9 of the wire harness clip 8 and the wire harness, as is the case with the first embodiment, are fixed to each other by being covered by the self adhesive sheet 4. What the wire harness clip 8 and the wire harness are fixed by the self adhesive sheet 4 is herein referred to as "wire harness with clip," provided with the reference sign of 110. The wire harness with clip 110 that is assembled entire the plate 9 and the wire harness being covered by the self adhesive sheet 4, as is the case with the first embodiment, is fixed to the panel 3 by the latched part 5 of the wire harness clip 8 being press-fitted in the hole 3*a* of the panel 3, and by the pair of latching part 52 and the plate 9 sandwiching the panel 3.

Furthermore, in the present invention, since the width of the both ends of the plate 9 in its length direction is formed smaller than that of the middle in its length direction, when the self adhesive sheet 4 is deformed as by the wire harness 2 being strained with the latched part 5 press-fitted in the hole 3*a* of the panel 3 (a state of FIG. 15), and on the both ends of the plate 9, i.e., the pair of circumferential portions 91 a load is placed, elastic deformation of the pair of circumferential portions is unlikely propagated to the middle of the plate 9, i.e., the base portion 90, thus making it possible to reduce the deformation of the base portion 90.

Thus, since the present invention allows the deformation of the base portion 90 to reduce, it is also made possible to reduce deformation of the latched part 5 in continuous with the base portion 90, preventing the panel 3 from dropping out of the panel 3 by the latched part 5 being released from the hole 3*a* of the panel 3. Also, as shown in FIG. 14, since the base portion 90 is where the self adhesive sheet 4 is pressed to the outer circumference of the hole 3*a* of the panel 3 (dotted line D in FIG. 14 shows the both ends of the base portion 90), it is made possible to reduce the deformation of the base 90, keeping well the sealing to the hole 3*a* of the panel 3.

Furthermore, since the wire harness clip 8 of the present embodiment has the plate 9 formed so as to become narrower gradually as approaching from the middle in its length direction to the both ends in its length direction, contact area of the plate 9 and the self adhesive sheet 4 is made larger than that of the first embodiment, enhancing effect of prevention of water or dust penetrating from the hole 3*a* of the panel 3 into the side near the plate 9.

Furthermore, the latched part 5, as is the case of the first embodiment, has the pair of latched pieces 52 spaced from each other in the horizontal direction, and has the drainage hole 51 passing through the pillar 50 in the vertical direction.

It follows from this that water (washing water or rain) can be prevented from collecting on the surface of the pillar 50, or that this water can be prevented from penetrating from the hole 3a of the panel 3 following the surface of the pillar 50 into the hole 3a of the panel 3.

Figure 15:
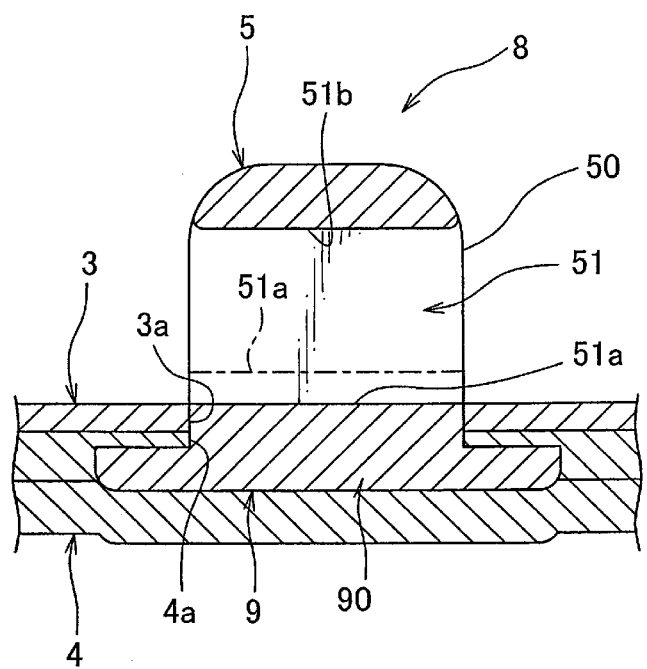
FIG. 15 is a cross-sectional view taken along F-F line in the FIG. 14.
Figure 16A:
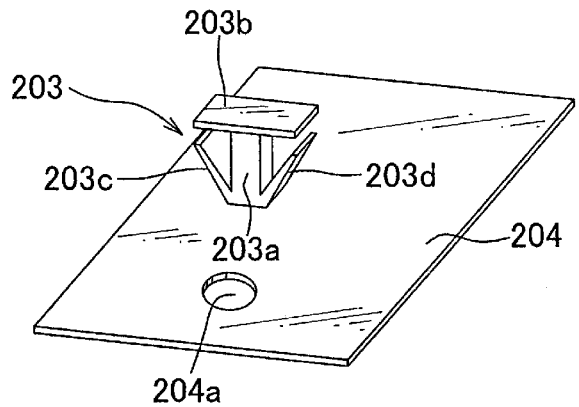
FIG. 16A is an explanatory view of the wire harness fixing structure fixing a wire harness to a fixed member using conventional wire harness clip.
Figure 16B:
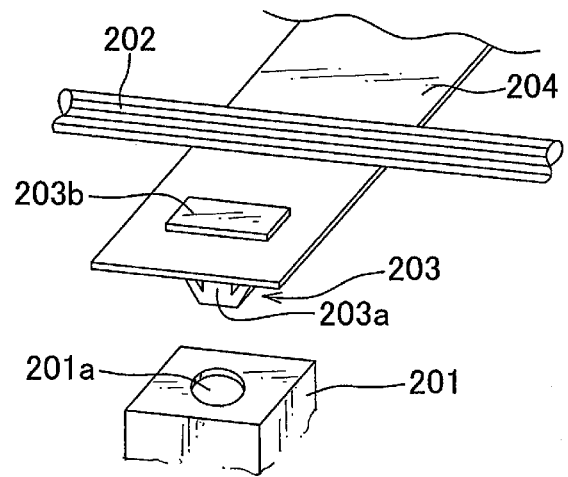
FIG. 16B is also an explanatory view of the wire harness fixing structure fixing a wire harness to a fixed member using conventional wire harness clip.
Figure 16C:
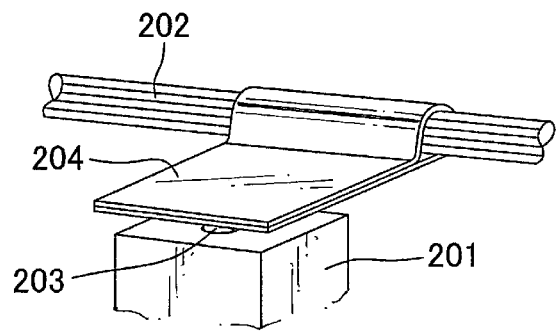
FIG. 16C is also an explanatory view of the wire harness fixing structure fixing a wire harness to a fixed member using conventional wire harness clip.

Furthermore, in the present invention, as shown in FIGS. 14, 15, the drainage hole 51 is positioned away from an opposite side opposite to the plate 9 in the panel 3 with the latched part 5 press-fitted in the hole 3a of the panel 3. The inner surface 51a near the plate 9 of two inner surfaces 51a, 51b, opposite to each other in the upstanding direction of the pillar 50 in the above mentioned drainage hole 51 is positioned as far as the opposite side opposite to the plate 9 in the panel 3. Other inner surfaces 51b, 51c, and 51d of the drainage hole 51 is naturally positioned farther away than the opposite side of the plate 9 in the panel 3. It follows from this that as shown in FIG. 15, side face of the pillar 50 in its width direction is adhered to an inner face of the hole 3a of the panel 3, making it possible further to prevent water from penetrating.

Note that the aforementioned embodiments merely show such as, but not limited to, typical embodiment of the present invention. Namely, it is to be understood that various changes and modifications will be apparent to those skilled in the art. Therefore, unless otherwise such changes and modifications depart from the scope of the present invention hereafter defined, they should be construed as being included therein.

REFERENCE SIGNS LIST

1,101 wire harness fixing structure
2 wire harness
3 panel
3a hole
4 self adhesive sheet (adhesive sheet)
4a through hole
5 latched part
6,9 plate
7,8 wire harness clip
50 pillar
51 drainage hole (through hole)
52 latched piece
60 base portion
61 extension portion

The invention claimed is:

1. A wire harness fixing structure for fixing a wire harness to a panel, comprising:
   a wire harness clip used for fixing the wire harness to the panel, including
      a plate, both ends of the plate in a length direction thereof being formed narrower than a middle of the plate, and
      a latched part disposed in the middle of the plate, press-fitted and latched in a hole disposed in the panel; and
      an adhesive sheet covering and fixing the plate and the wire harness, wherein the adhesive sheet is formed elastically so as to contract upon its being pressured, and restore a thickness thereof upon its being released from being pressured, wherein the adhesive sheet is provided with a through hole passing through the latched part, and wherein the latched part being latched in the hole of the panel allows the adhesive sheet between the plate and the panel to be compressed, and adhered to an outer circumference of the hole.

2. The wire harness fixing structure as claimed in claim 1, wherein the plate is composed of a plate-like base portion arranged at the middle of the plate, and a pair of extension portion extending from the both ends in the length direction in a direction away from each other, wherein the pair of extension portion is formed narrower than the base portion.

3. The wire harness fixing structure as claimed in claim 1, wherein the plate is formed gradually narrower as approaching from the middle of the plate to the both ends in the length direction.

4. The wire harness fixing structure as claimed in claim 2, wherein the pair of the extension portion is formed shorter than the base portion in the length direction.

5. The wire harness fixing structure as claimed in claim 1,
   wherein the latched part is provided with
      a pillar upstanding from the plate,
      a latched piece extending from a top of the pillar,
   wherein a tip of latched piece is engaged with an edge of the hole of the panel, and wherein the pillar is provided with a through hole.

6. The wire harness fixing structure as claimed in claim 2,
   wherein the latched part is provided with
      a pillar upstanding from the plate,
      a latched piece extending from a top of the pillar,
   wherein a tip of latched piece is engaged with an edge of the hole of the panel, and wherein the pillar is provided with a through hole.

7. The wire harness fixing structure as claimed in claim 3,
   wherein the latched part is provided with
      a pillar upstanding from the plate,
      a latched piece extending from a top of the pillar,
   wherein a tip of latched piece is engaged with an edge of the hole of the panel, and wherein the pillar is provided with a through hole.

8. The wire harness fixing structure as claimed in claim 4,
   wherein the latched part is provided with
      a pillar upstanding from the plate,
      a latched piece extending from a top of the pillar,
   wherein a tip of latched piece is engaged with an edge of the hole of the panel, and wherein the pillar is provided with a through hole.

9. The wire harness fixing structure as claimed in claim 5, wherein an inner face of the through hole, with the latched part press-fitted and latched in the hole of the panel, is positioned as far as, or farther than, an opposite side of the panel opposite to the plate in a separating direction from the plate.

10. The wire harness fixing structure as claimed in claim 6, wherein an inner face of the through hole, with the latched part press-fitted and latched in the hole of the panel, is positioned as far as, or farther than, an opposite side of the panel opposite to the plate in a separating direction from the plate.

11. The wire harness fixing structure as claimed in claim 7, wherein an inner face of the through hole, with the latched part press-fitted and latched in the hole of the panel, is positioned as far as, or farther than, an opposite side of the panel opposite to the plate in a separating direction from the plate.

12. The wire harness fixing structure as claimed in claim 8, wherein an inner face of the through hole, with the latched part press-fitted and latched in the hole of the panel, is positioned as far as, or farther than, an opposite side of the panel opposite to the plate in a separating direction from the plate.

* * * * *